(12) United States Patent
Sicola et al.

(10) Patent No.: US 9,110,731 B1
(45) Date of Patent: Aug. 18, 2015

(54) HARD ALLOCATION OF RESOURCES PARTITIONING

(75) Inventors: Stephen J. Sicola, Monument, CO (US); William A. Pagano, Colorado Springs, CO (US); Clark Edward Lubbers, Colorado Springs, CO (US); Randolph Scott Crupper, Littleton, CO (US); Michael J. Hare, Falcon, CO (US)

(73) Assignee: Xiotech Corporation, Colorado Springs, CO (US)

(*) Notice: Subject to any disclaimer, the term of this patent is extended or adjusted under 35 U.S.C. 154(b) by 262 days.

(21) Appl. No.: 13/586,425

(22) Filed: Aug. 15, 2012

(51) Int. Cl.
*G06F 9/00* (2006.01)
*G06F 12/02* (2006.01)
*G06F 13/00* (2006.01)
*G06F 9/50* (2006.01)

(52) U.S. Cl.
CPC ............ *G06F 9/5077* (2013.01); *G06F 9/5088* (2013.01)

(58) Field of Classification Search
CPC .............................. G06F 9/5077; G06F 9/5088
USPC ............ 718/1, 100; 713/1, 2, 100; 711/1, 100
See application file for complete search history.

(56) References Cited

U.S. PATENT DOCUMENTS

| | | | |
|---|---|---|---|
| 6,167,512 A | 12/2000 | Tran | |
| 6,353,844 B1 * | 3/2002 | Bitar et al. | 718/102 |
| 6,493,800 B1 * | 12/2002 | Blumrich | 711/129 |
| 6,877,158 B1 | 4/2005 | Arndt | |
| 7,266,823 B2 * | 9/2007 | Alford, Jr. | 718/104 |
| 7,290,260 B2 * | 10/2007 | Miller | 718/104 |
| 7,310,724 B2 | 12/2007 | Chen | |
| 7,363,394 B2 | 4/2008 | Shen et al. | |
| 7,502,803 B2 | 3/2009 | Culter | |
| 7,546,488 B2 | 6/2009 | Walker et al. | |
| 7,568,052 B1 * | 7/2009 | Cwiakala et al. | 710/8 |
| 7,610,481 B2 | 10/2009 | Cool | |
| 7,707,362 B2 | 4/2010 | Bean | |
| 7,761,649 B2 | 7/2010 | Lubbers | |
| 7,877,358 B2 | 1/2011 | Ritz et al. | |
| 7,908,457 B2 * | 3/2011 | Arndt et al. | 711/209 |
| 7,987,464 B2 * | 7/2011 | Day et al. | 718/104 |
| 8,082,547 B1 * | 12/2011 | Herington et al. | 718/104 |
| 8,086,838 B2 | 12/2011 | Harmer | |
| 8,140,816 B2 * | 3/2012 | Hofer et al. | 711/173 |
| 8,219,995 B2 * | 7/2012 | Flemming et al. | 718/104 |
| 8,245,235 B1 * | 8/2012 | Belady et al. | 718/104 |
| 8,424,078 B2 * | 4/2013 | Accapadi et al. | 726/17 |
| 2003/0115443 A1 | 6/2003 | Cepulis | |
| 2003/0212883 A1 * | 11/2003 | Lee et al. | 713/1 |

(Continued)

*Primary Examiner* — Mark Connolly
(74) *Attorney, Agent, or Firm* — Hall Estill Attorneys at Law (57) ABSTRACT

Apparatus and associated methodology involving use of a multiple-core processor. A reserved hard allocation of resources partition (HARP) dedicates physical resources for operably supporting a first processing function. The dedicated resources of the reserved HARP include a reserved physical memory that is sized in relation to data processing requirements of the first processing function. The dedicated resources of the first HARP also include a command buffer residing in the reserved physical memory. The dedicated resources of the first HARP also include a reserved physical core of the multiple core processor. The apparatus also includes a second HARP having resources that are used for operably supporting a different second processing function. The second HARP resources operably put transaction requests from the second processing function to the command buffer in the first HARP.

19 Claims, 10 Drawing Sheets

(56) References Cited

U.S. PATENT DOCUMENTS

| | | |
|---|---|---|
| 2008/0040709 A1 | 2/2008 | Blancha |
| 2009/0089787 A1* | 4/2009 | Giles et al. .................... 718/104 |
| 2010/0058335 A1 | 3/2010 | Weber |
| 2011/0219208 A1* | 9/2011 | Asaad et al. .................... 712/12 |
| 2011/0276794 A1 | 11/2011 | Yamaguchi |
| 2012/0084531 A1* | 4/2012 | Funk et al. .................... 711/171 |
| 2013/0179674 A1* | 7/2013 | Im et al. ........................ 713/100 |
| 2014/0007124 A1* | 1/2014 | Ashok et al. .................. 718/104 |

\* cited by examiner

HARD ALLOCATION OF RESOURCES PARTITIONING

FIELD

The present embodiments relate generally to the field of complex processor systems and more particularly but without limitation to a hard allocation of resources partitioning.

BACKGROUND

For many years in the past the processing speed of computer processor units (CPUs) steadily increased; more recently it has leveled out. As a result of that leveling, the market has moved toward multiple-core processor designs in which two or more physical processor cores work concurrently. Symmetric multi-processing (SMP), for example, is a multiprocessor architecture in which multiple processor cores share a memory and are operated by a common operating system.

In theory, two concurrently operating processors would be substantially twice as fast as just one, and the logical extension of that theory is that sixteen processors would be sixteen times faster than just one. However, scalability comes at a high price of overcoming difficult programming difficulties. The multiple processors in an SMP system are connected together such as by a bus or a crossbar switch and the like, or by a network connection. The operating system and the software/firmware must control both the processing activities of the individual processors as well as the intercommunications amongst the processors. There is a significant performance cost due just to the overhead of hardware interrupts that are necessary to process the piecemeal software and kernel threads. Although improvements can be realized by the use of compilers and distributed storage programming techniques, there is a limit at which the addition of more processors begins to actually diminish the overall data processing power.

The enormous processing power of modern processor complexes has ushered in a more recent trend toward employing a hypervisor to create and manage one or preferably a number of virtual machines (VMs) that run completely independent instances of firmware. However, the hypervisor model is constrained by the operating system it runs, and as such is suboptimal with respect to stewardship of hardware resource usage. What is needed is to break away from the hypervisor model by otherwise controlling what resources are not available to the general purposes of the operating system for the reason that they have been reserved for a specially designated purpose. It is to these and other improvements that embodiments of the present invention are directed.

SUMMARY

Embodiments of the present invention contemplate an apparatus that executes computer instructions. The apparatus includes a multiple-core processor. A reserved hard allocation of resources partition (HARP) dedicates physical resources for operably supporting a first processing function. The dedicated resources of the reserved HARP include a reserved physical memory that is sized in relation to data processing requirements of the first processing function. The dedicated resources of the first HARP also include a command buffer residing in the reserved physical memory. The dedicated resources of the first HARP also include a reserved physical core of the multiple core processor. The apparatus also includes a second HARP having resources that are used for operably supporting a different second processing function. The second HARP resources operably put transaction requests from the second processing function to the command buffer in the first HARP.

Some embodiments of the present invention contemplate a method that includes:

obtaining a complex processor system having a multiple-core processor; booting the complex processor system to create a first hard allocation of resources partition (HARP) exclusively reserving a first physical memory sized for operating a first processing function; after creating the first HARP, further booting the complex processor system creating a second HARP having a differently addressed second physical memory; and putting a processing command from a second processing function running on the second HARP to a command queue residing in the first physical memory.

Some embodiments of the present invention contemplate hard allocation of resources partition (HARP) logic in a storage controller. The storage controller includes an embedded storage array controller (ESAC), a memory, and a multiple-core processor operably running an operating system. The HARP logic is embodied in stored computer instructions that are executable to exclusively reserve, prior to booting the operating system, a physical portion of the memory and a physical core of the multiple-core processor for the ESAC's use in executing input/output (I/O) commands with a data storage drive array.

DESCRIPTION

The disclosure of the specification includes particular embodiments in which a storage controller and an operating system cooperatively transact data storage transactions in a distributed data storage environment. Those particularly disclosed embodiments are merely illustrative and in no way limiting of the contemplated embodiments of the claimed invention, which more generally covers a first processing function having a set of reserved processing resources and cooperatively functioning with a second processing function supported by different processing resources.

Figure 1:
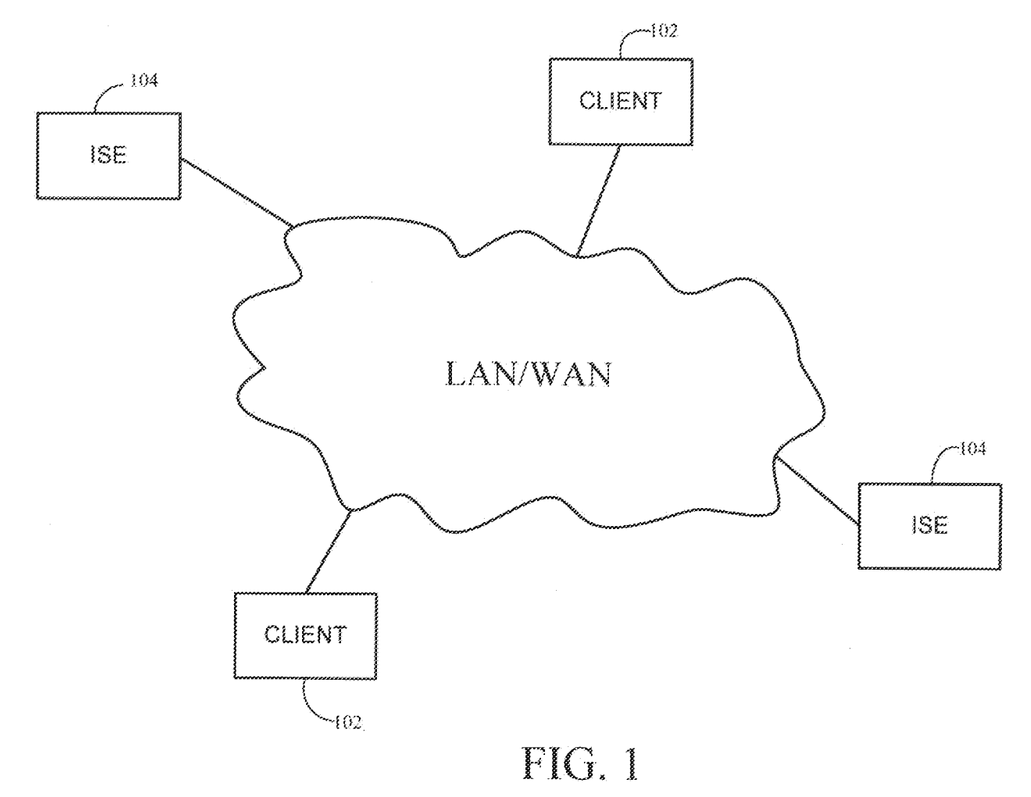
FIG. 1 is a diagrammatic representation of a distributed data storage system constructed in accordance with embodiments of the present invention.

FIG. 1 is an illustrative computer system 100 constructed in accordance with embodiments of the present invention. One or more processing clients 102 are networked to one or more network-attached intelligent storage elements (ISEs) 104 via a local area network (LAN) and/or wide area network (WAN) 106. Preferably, the LAN/WAN 106 uses Internet protocol (IP) networking infrastructure for communicating over the World Wide Web. The clients 102 access applications resident in the ISEs 104 that routinely need data stored locally by the ISE 104 in a data storage device array. Each ISE 104 provides blocks of data storage capacity for storing the data over various selected communication protocols such as serial ATA and fibre-channel, with enterprise or desktop class storage medium making up the data storage device array.

Figure 2:
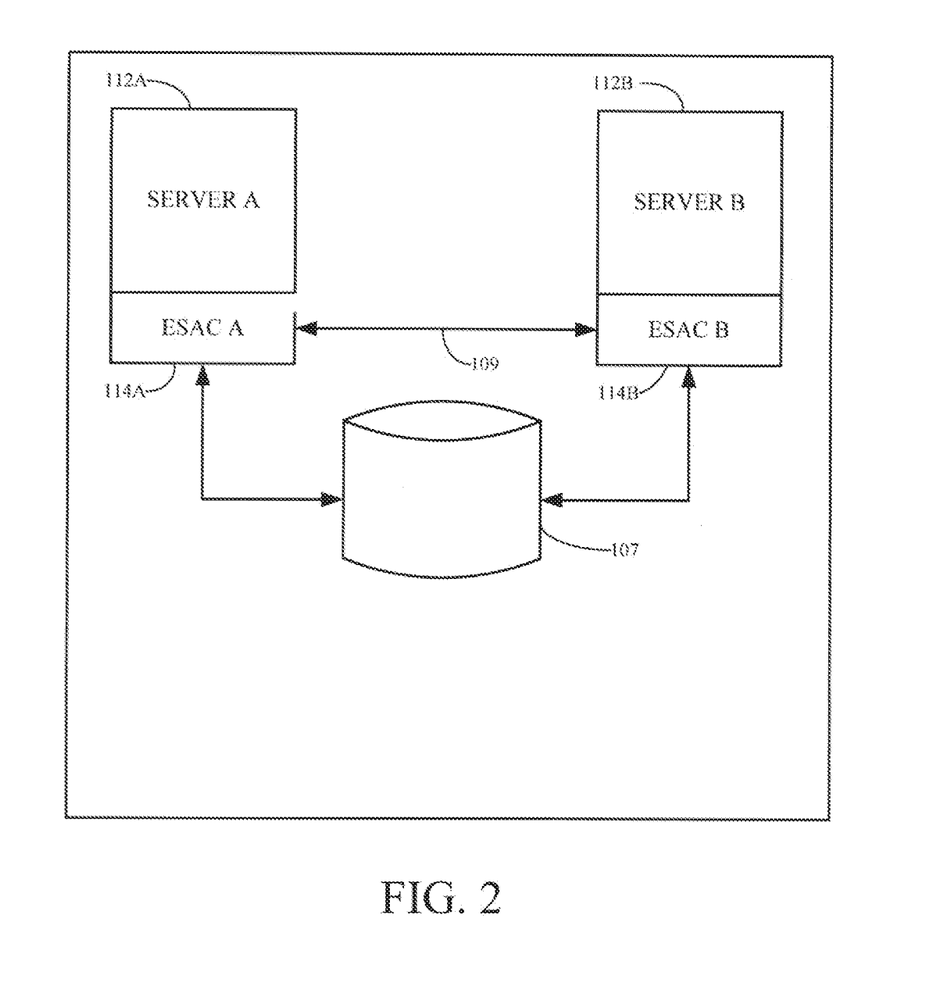
FIG. 2 is a simplified diagrammatic representation of the intelligent storage element of FIG. 1.

FIG. 2 is a simplified diagrammatic view of the ISE 104 in the computer system 100 of FIG. 1. Each ISE 104 includes dual redundant storage servers 112 (denoted A and B) preferably operating on the data storage capacity 107 as a set of data storage devices characterized as a redundant array of independent drives (RAID). That is, the servers 112 and data storage capacity 107 preferably utilize a fault tolerant arrangement so that the servers 112 utilize parallel, redundant links and at least some of the user data stored by the ISE 104 is stored in redundant format within the data storage capacity 107.

The servers 112 operate in conjunction with redundant embedded storage array controllers (ESACs) 114 to provide managed reliability of the data integrity. Although in these illustrative embodiments the ESACs 114 are described as being embedded in the servers 112, in equivalent alternative embodiments the ESAC 114 can otherwise reside outside the server 112, and thus separately therefrom elsewhere in the ISE 104. As depicted here, $ESAC_A$ has access to memory reserved for $ESAC_B$ in the other processor complex via a communication link 109 such as but not limited to a non-transparent bridge ("NTB").

Aspects of the managed reliability include invoking reliable data storage formats such as RAID strategies. Managed reliability can also include scheduling of diagnostic and correction routines based on a monitored usage of the system. Data recovery operations are executed for copying and reconstructing data. Other aspects of the managed reliability include responsiveness to predictive failure indications in relation to predetermined rules. Each ESAC 114 can manage assorted storage services such as virtualization, routing, volume management, and data migration/replication.

Figure 3:
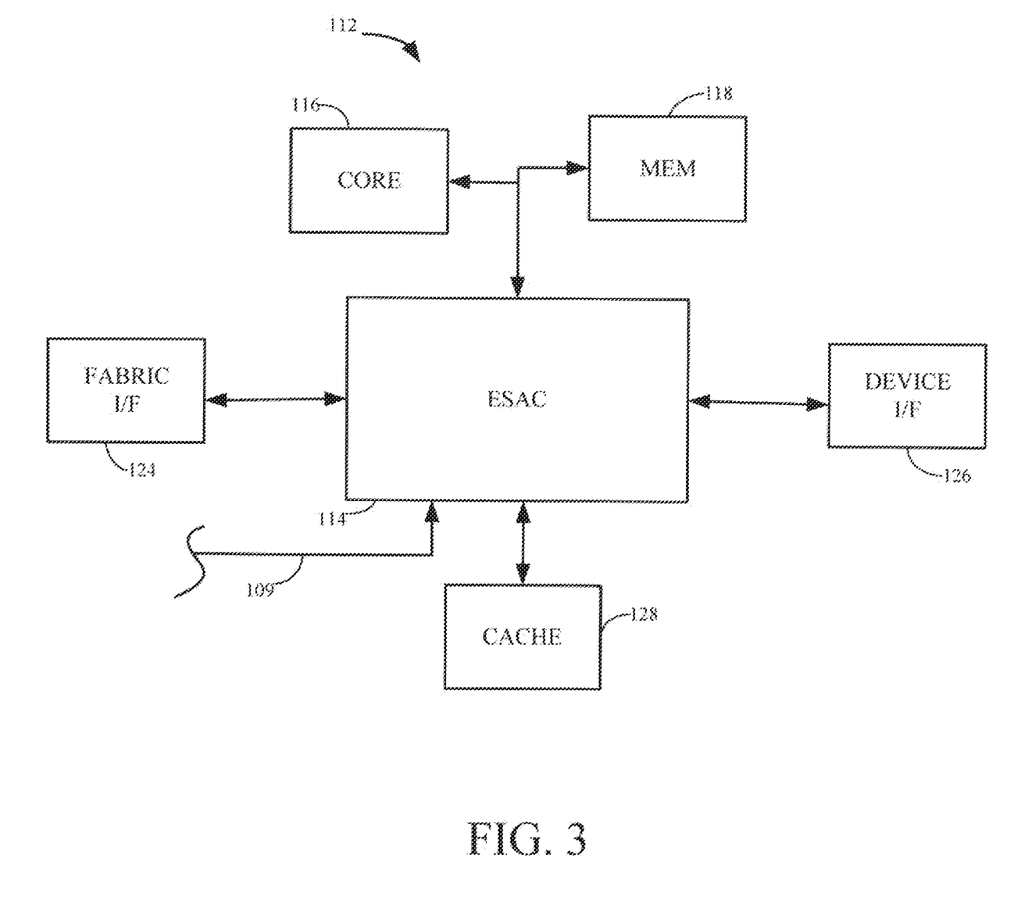
FIG. 3 is a functional block depiction of the embedded storage array controller (ESAC) of FIG. 2.

FIG. 3 is a block diagram depicting one of the servers 112 constructed in accordance with illustrative embodiments of the present invention. A physical processing core 116, preferably characterized as one physical processing core of a programmable, multiple-core processor, provides top level control in accordance with programming steps and processing data stored in memory 118, which can include non-volatile memory (such as flash memory or similar) as well as dynamic random access memory (DRAM).

A fabric interface (I/F) circuit 124 communicates between the ESAC 114 and the fabric 106 and hence, in turn, with other ISEs 104 and clients 102 connected to the fabric 106. In illustrative embodiments the I/F 124 can be fibre channel ("FC"), fibre channel over Ethernet ("FCOE"), internet small computer systems interface ("iSCSI"), Infiniband, and the like. A storage device I/F circuit 126 communicates between the ESAC 114 and the storage device array 107 (FIG. 2). In illustrative embodiments the I/F 126 can be serial attached small computer systems interface ("SCSI") and the like. The I/F circuits 124, 126 and the ESAC 114 form a communication path passing input/output (I/O) commands and corresponding data between the storage array 107 and a target/source client 102 using cache memory 128.

Figure 4:
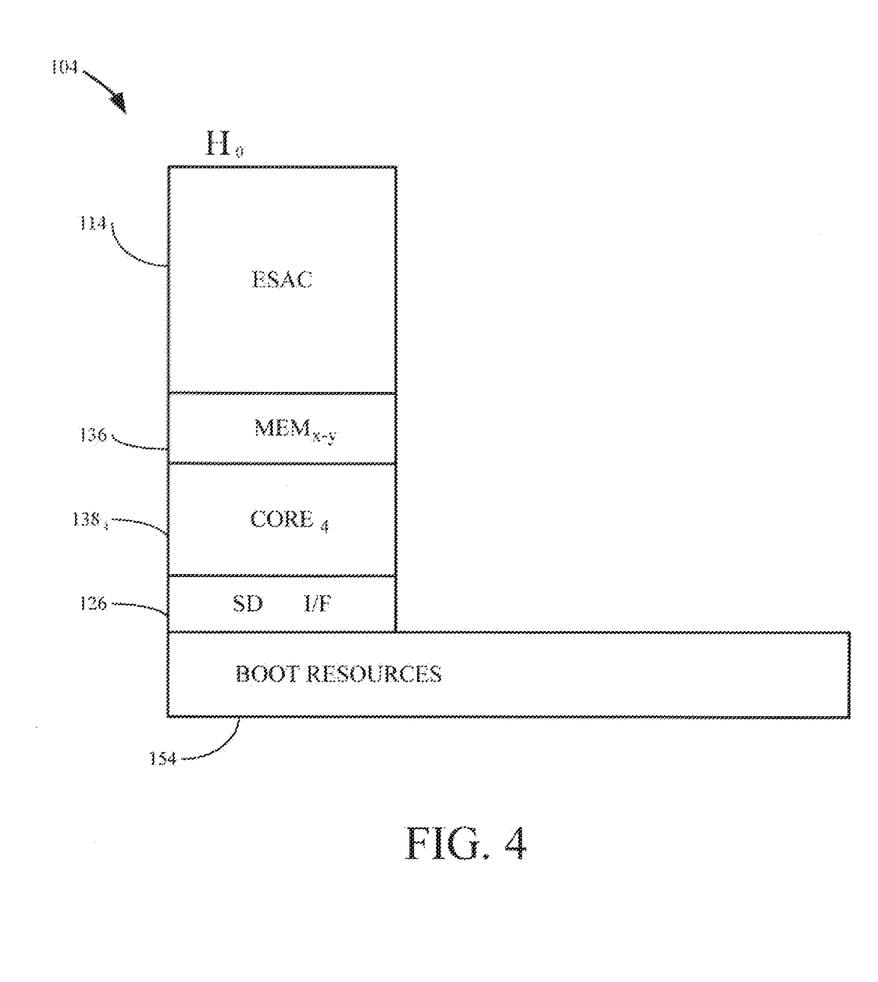
FIG. 4 is a functional block depiction of a first hard allocation of resources partition (HARP) $H_0$ dedicated exclusively for supporting operation of the ESAC.

FIG. 4 is a block depiction of a hard allocation of resource partition (HARP) $H_0$ that is constructed by the server 112 (FIG. 2) in accordance with these illustrative embodiments of the present invention. For purposes of this description and meaning of the claimed subject matter, generally the HARP $H_0$ reserves physical resources for operably performing some corresponding processing function. For example, the HARP $H_0$ in these illustrative embodiments reserves a physical volume 136 ("$MEM_{x-y}$") of the memory 118 (FIG. 3) for dedicating it in support of the ESAC 114 in operably processing I/O commands with the data storage device array 107. However, the contemplated embodiments of the claimed invention are not limited to these particularly disclosed illustrative embodiments.

In these illustrative embodiments, the reserved physical volume 136 can correspond to a predetermined data storage capacity, or can be dynamically set by predetermined parametric values such as but not limited to cache 128 (FIG. 3) load history and the like. The HARP $H_0$ also reserves one of the cores $138_4$ ($CORE_4$ depicted) for the same dedicated purpose of supporting operation of the ESAC 114. A pre-boot sequence during a booting cycle, such as at startup or initialization, defines these reserved physical boot resources for $H_0$.

A traditional model for usage of the complex of hardware embodied in a server means that a variety of different processing devices performing different functions compete for time on one or more CPUs, each typically having four to eight processor cores. That is, the operating system (OS) manages all of the resources in the system and provides access to them for a myriad of applications, usually in parallel, that may run on the server. The server is usually very powerful and typically underutilized as all the applications combined being run by the multiple cores do not use but a fraction of the capabilities of the hardware.

The present embodiments provide a different model, one that eliminates the enormous processing overhead of the traditional model, especially that associated with the application environment interrupts and time slicing necessary for context switching as applications are run across multiple processor cores.

To resolve these problems the present embodiments create the reserved HARP $H_0$ during a pre-boot phase to create dedicated resources for a specialized server function, prior to a completion of booting the entire complex processor system. Whether or not another processing function running on the complex processor system, such as an OS running on a second HARP, is aware of the reserved HARP $H_0$ is not definitive of the present embodiments as long as it does not claim control itself of the resources of the reserved HARP $H_0$. Generally, the pre-boot creating of the reserved HARP $H_0$ defines modified hardware initializations in the basic input-output system (BIOS) that are subsequently used to boot the OS running on the resources of the second HARP.

In these illustrative embodiments the reserved HARP $H_0$ is created for the ESAC 114 and runs entirely on only one processing core $116_4$ of a multiple core processor with exclusive control of access to the physical volume 136 portion of the physical memory (such as 2 GB to 4 GB) 118. The ESAC 114 thereby has access to the data storage devices 107 and to a portion of the address window of the NTB 109 (FIG. 2).

In successful reductions to practice of these embodiments the reserved HARP $H_0$ was created by modifying extensible file interface (EFI) data structures used by the BIOS during a boot sequence. Other hardware besides the physical processing-core and the physical memory can likewise be reserved as needed, such as but not limited to other required peripheral devices like a console serial port. This approach was tested with Microsoft's Windows Server 2008 OS, using the advanced configuration and power interface (ACPI) system information to determine what processing cores are present and yet another interface within BIOS, such as hand off block (HOB) tables, to determine what physical memory it can reserve for $H_0$.

Figure 5:
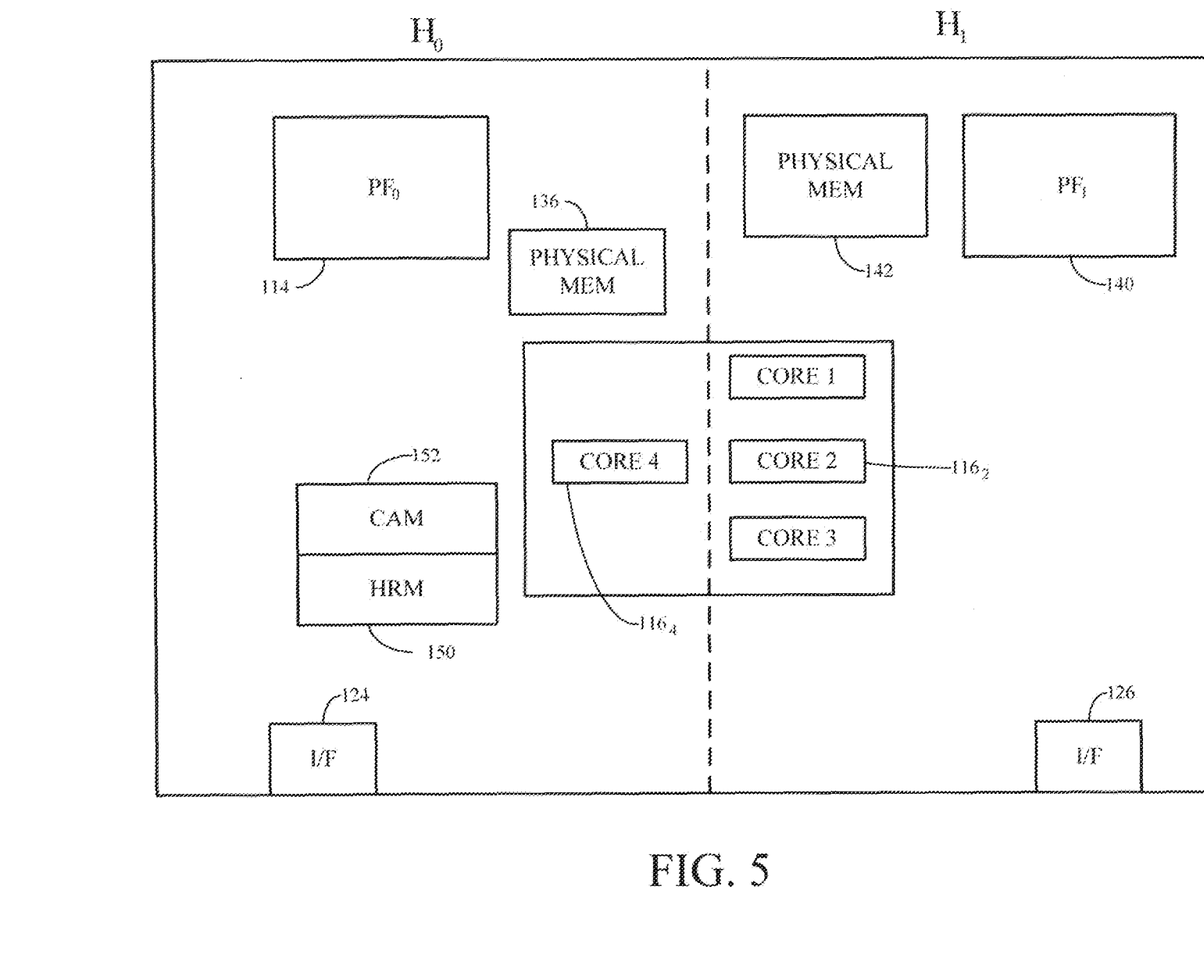
FIG. 5 diagrammatically depicts two inter-communicating HARPs $H_0$, $H_1$.

In the illustrative embodiments of FIG. 5 the multiple-core processor is depicted as having four processor cores, although these embodiments are merely illustrative and not limiting of the contemplated embodiments. Although the illustrative embodiments describe $H_0$ and $H_1$ supporting the ESAC 114 and the OS 140, respectively, the claimed embodiments more generally contemplate $H_0$ supporting a first processing function $PF_0$ and HARP $H_1$ supporting a second processing function $PF_1$. For example, without limitation, $PF_0$ can be any type of automated device such as a machine controller or a process controller, and $PF_1$ can be any type of control and/or communication system for monitoring and controlling $PF_0$.

Figure 6:
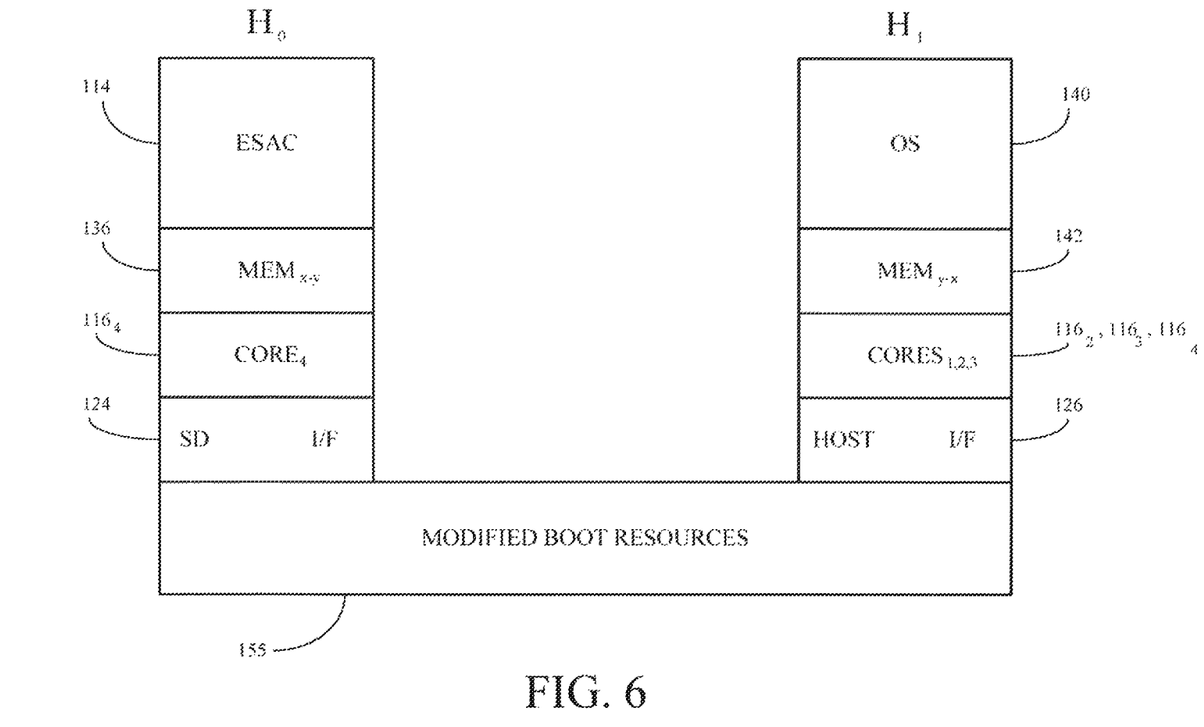
FIG. 6 is similar to FIG. 4 but depicts the reserved physical resources for both HARPs $H_0$, $H_1$.

In these illustrative embodiments FIGS. 5 and 6 depict the HARP $H_0$ discussed above for operating the ESAC 114 as well as another HARP $H_1$ for operating a generic OS 140. The various functional aspects of the blocks can be realized in software, firmware, hardware or some combination thereof, and can be either part of or separately cooperative with a policy processor executing a real time operating system (RTOS) in performing the functionality.

Figure 7:
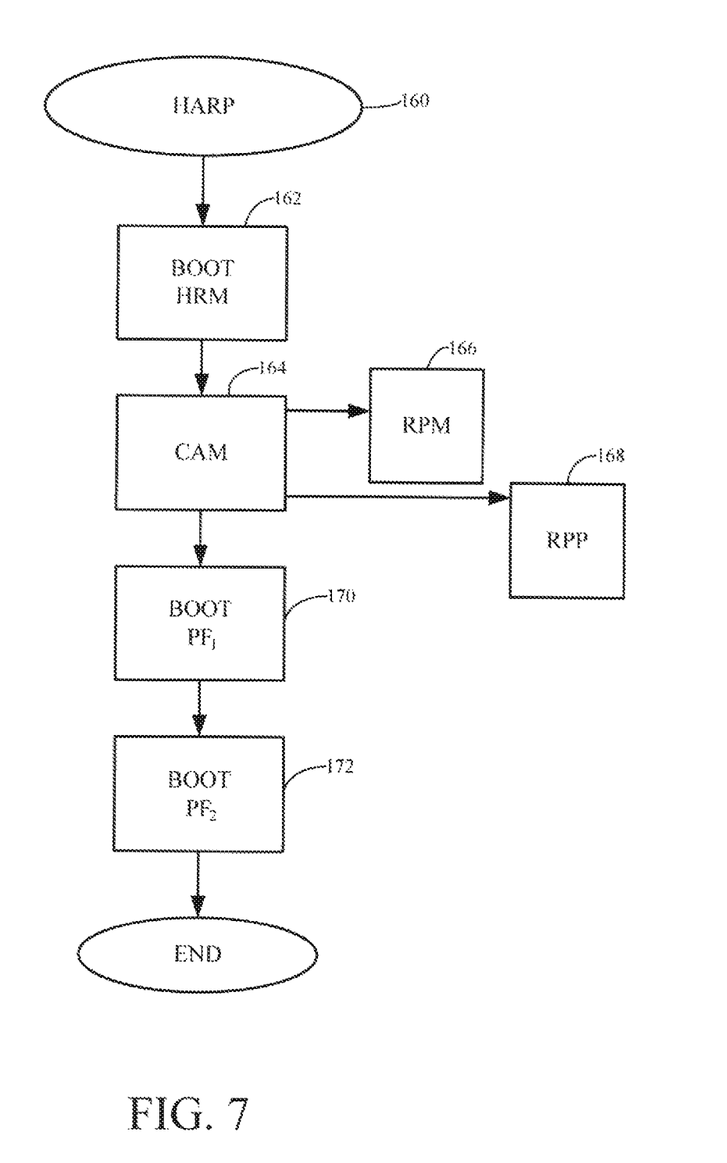
FIG. 7 is a flowchart depicting steps in a method for HARD ALLOCATION OF RESOURCE PARTITIONING in accordance with embodiments of the present invention.

Further including consideration of FIG. 7, which depicts a flowchart of steps in a method 160 for HARD ALLOCATION of RESOURCES PARTITIONING in accordance with embodiments of the present invention. The method 160 begins in these illustrative embodiments in block 162 by a hardware resource manager (HRM) 150 (FIG. 5) in the reserved HARP $H_0$ that is configured with executable instructions that respond to a boot routine, such as during a startup or an initialization, by running on the bootstrap processing core to perform a pre-boot sequence. In block 164 the HRM 164 furthermore invokes a core allocation manager (CAM) 152 (FIG. 5).

The CAM 152 generally reserves physical memory in block 166 (reserved partition memory, RPM 136) and reserves one or more physical processing cores in block 168 (reserved partition processor, RPP $116_4$) for the dedicated purpose of supporting operation of the ESAC 114. As for the RPM 136, in illustrative embodiments the CAM 152 can execute EFI-BIOS instructions to obtain an entire listing of memory allocation such as by calling the GetMemoryMap( ).[1] Based upon a predetermined size of memory that is necessary for operably supporting the functions of the ESAC 114, the CAM 152 can call AllocatePages( )[2] to allocate one or more respective ranges of memory as being unavailable boot resources for being identified as memory type EfiReservedMemoryType.[3] That defines the RPM (MEM$_{x-y}$) 136 as a resource for the first HARP $H_0$. The CAM 152 can in some illustrative embodiments likewise reserve the differently addressed second physical memory 142 (MEM$_{y-z}$) for the second HARP $H_1$. These modifications of the boot resources 154 (FIG. 4) form the modified boot resources 155 (FIG. 6) for subsequently booting the second HARP $H_1$. That is, the modified boot resources 155 in FIG. 6 do not include the reserved resources RPM 136, RPP $116_4$ for purposes of booting the second HARP $H_1$.

[1] UEFI Specification ver. 2.3 pg. 137.
[2] Id. at pg. 133.
[3] Id. at 134.

Continuing with FIG. 7, as for reserving a physical processing core in block 168, in illustrative embodiments the CAM 152 can modify onboard ACPI code to reserve one or more selected processing cores (RPP) for the first HARP $H_0$. The CAM 152 first selects which of the multiple processing cores to reserve, such as for example the highest core in the depicted illustrative embodiments, for dedicated use by the ESAC 114. The "highest" core can be defined in terms of which of the physical processing cores has the two logical CPUs with the highest APIC ID numbers. The lowest APIC ID is generally recognized as the bootstrap processor (BSP), the processor that will be included in those executing the OS 140 during booting.

For example, in illustrative embodiments the CAM 152 can execute computer instructions that modify the Multiple APIC[4] Description Table (MADT) for the selected processing core(s) by setting the "Local APIC Flags"[5] value to zero. The CAM 152 can likewise modify the ACPI differentiated system descriptor table (DSDT)[6] to reserve a communication port and not log the reserved port in the system management BIOS (SMBIOS).

[4] Intel's advanced interrupt programmable controller.
[5] ACPI Specification Table 5-21.
[6] ACPI Specification Table 5-16.

With the reserved resources RPM 136, RPP $116_4$ identified, the CAM 152 can then invoke multiple processor (MP) service instructions to start the first HARP $H_0$ in block 170. Finally, the CAM 152 boots the OS 140 with the modified boot resources 155 (FIG. 6, not including RPM 136, RPP $116_4$) in block 172.

For purposes of this description the term "modified boot resources" 155 means a computer readable instruction, such as firmware code and the like, that as a result of invoking the CAM 152 defines the extent to which the full boot resources 154 (FIG. 4) are available to the OS 140. In these illustrative embodiments only the ESAC 114 can use the RPP $116_4$ and the RPM 136. Whether or not the OS 140 is aware of the reserved resources is irrelevant to the meaning of the term "modified boot resources" 155; what is definitive to the meaning of "modified boot resources" 155 is that it prevents the OS 140 from using the reserved resources.

These illustrative embodiments result in the formation of another HARP $H_1$ operably supporting the general-purpose OS 140 that is configured to communicate with remote network devices via the fabric 106. Similar in structure to the first HARP $H_0$, the second HARP $H_1$ can be formed by the CAM 152 to reserve the physical volume 142 ("MEM$_{y-z}$" of FIG. 6) of the memory 118 (FIG. 3) and to reserve one or more cores $116_1, 116_2, \ldots 116_n$ (CORE$_1$, CORE$_2$, CORE$_3$ depicted) for dedicating those physical resources in operable support of the OS 140.

Figure 8:
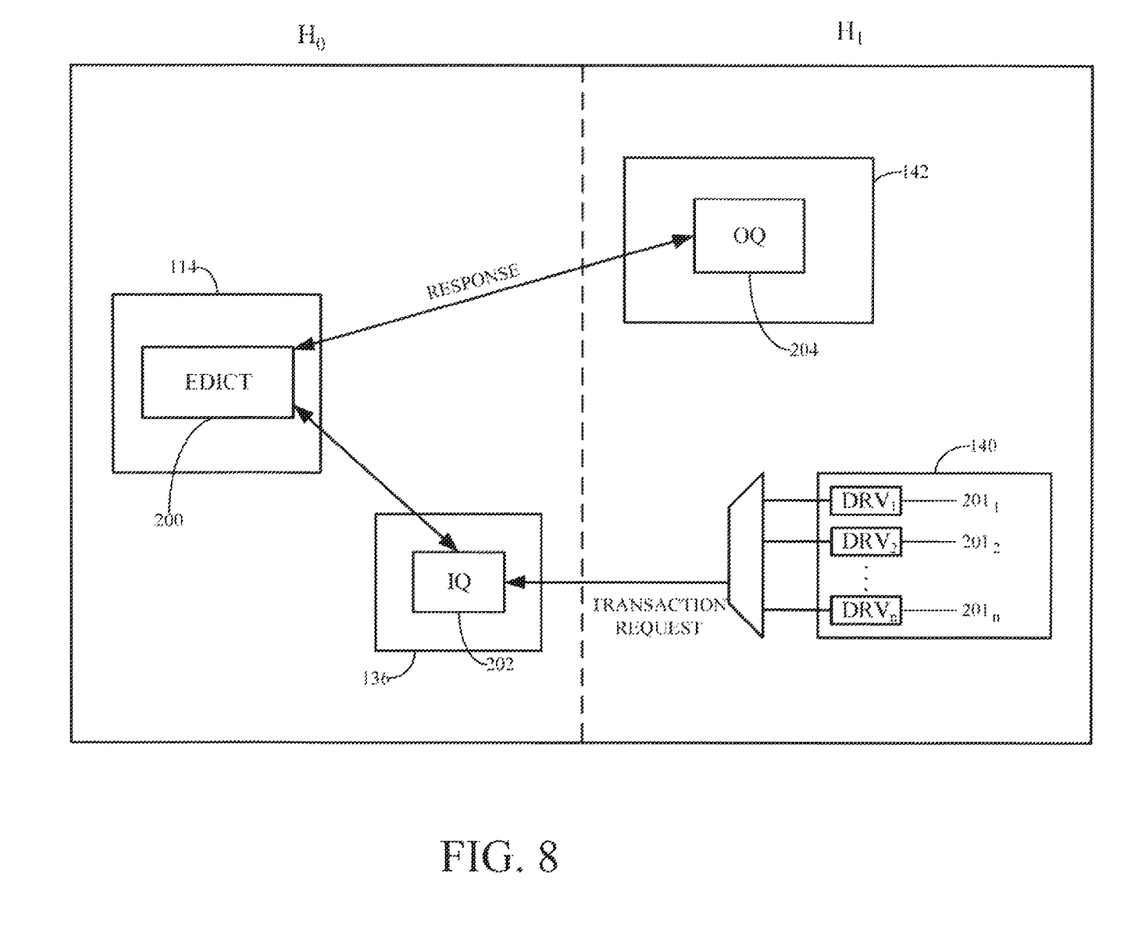
FIG. 8 diagrammatically depicts the routing of transaction requests from $H_1$ to $H_0$ and the corresponding responses from $H_0$ to $H_1$.

In illustrative embodiments the OS 140 running on the second HARP $H_1$ has been successfully practiced with the Windows 8 OS software by Microsoft, and with the ESAC 114 communicating with the array of storage devices 107 via PMC's Sierra PM8008 SAS Tachyon. FIG. 8 is a diagrammatical depiction of the inter-HARP $H_0$, $H_1$ communication between the ESAC 114 and the OS 140 in processing data I/O commands between a client 102 (FIG. 1) and the storage space 107 (FIG. 2). In these illustrative embodiments the first HARP $H_0$ includes an ESAC driver interface control table (EDICT) 200. A driver 201 claims, from the viewpoint of the OS 140, the storage device in the storage space 107 to which a particular data access will occur to satisfy an I/O command received from the client 102. The inter-HARP communication of these illustrative embodiments also provides a mechanism for passing an initial data structure and corresponding addresses. The physical address of the EDICT 200 can be passed via the client scratchpad register memory-mapped register, such as is referenced via BAR 0 of PMC's SAS Tachyon PCI-E interface. The ESAC 114 populates the EDICT 200 data structures and initiates the inter-HARP transactions after a suitable set of the data structures exist.

Generally, the EDICT 200 creates a data structure for a transaction request sent by one of the drivers 201 as an entry to a predefined input queue (IQ) 202 previously allocated by the first HARP $H_0$ to the reserved memory 136. That data structure likewise defines a corresponding entry to a predefined output queue (OQ) 204 in the other memory 142 to which the ESAC 114 will put a response to the transaction request. The data structure also allocates a scatter-gather list ("SGL") in the memory 142, which the driver in the second HARP $H_1$ populates with corresponding physical storage addresses. In these illustrative embodiments the first HARP $H_0$ can include a polling kernel that alternatively gets transaction request entries from the IQ 202 and puts responses to the OQ 204. Embedded direct access memory (DMA) engines can transfer data for each transaction request from the IQ 202 to the SGL for use by the corresponding OQ 204.

Figure 9:
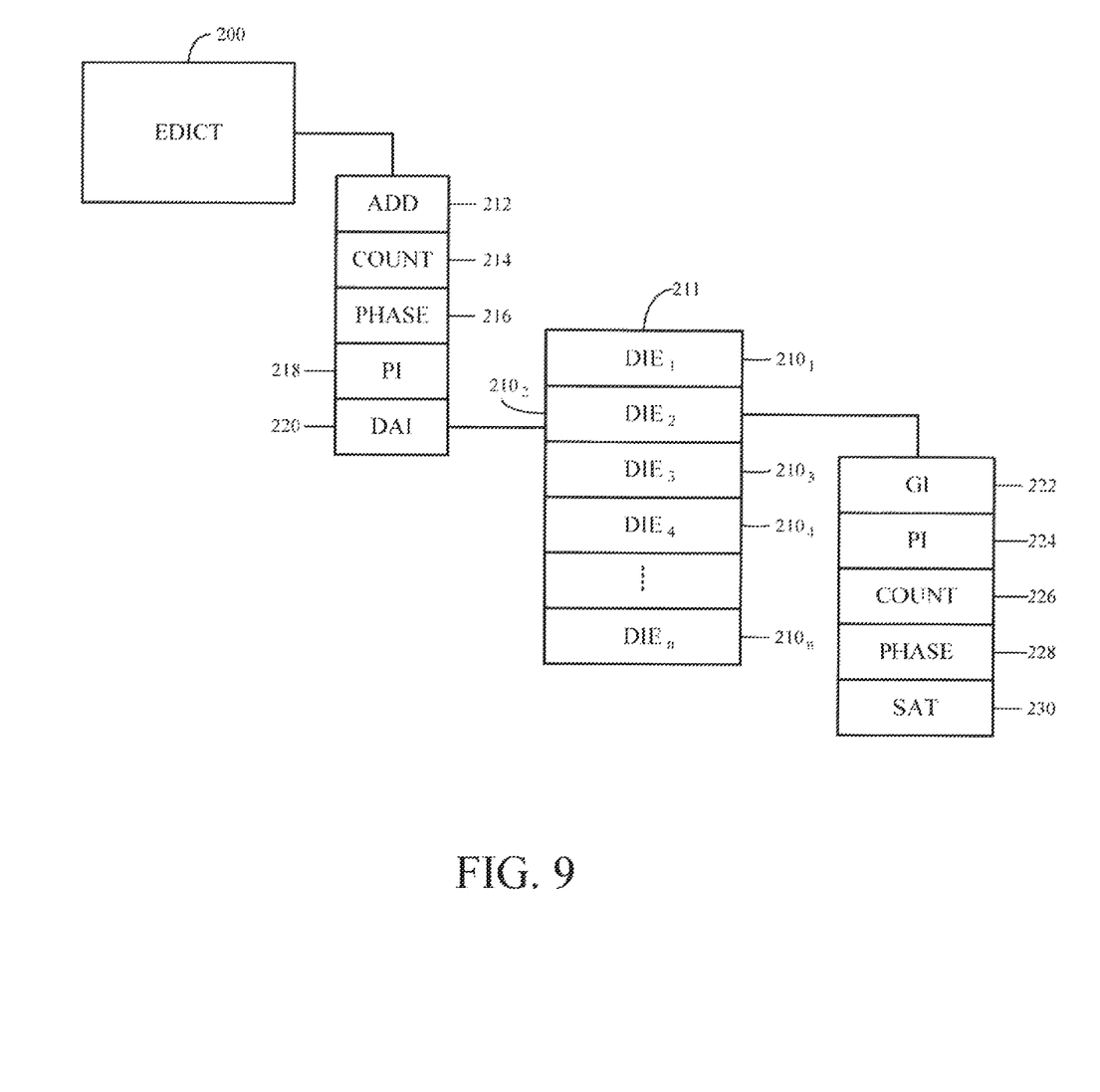
FIG. 9 diagrammatically depicts data structures associated with the routing in FIG. 8.

FIG. 9 diagrammatically depicts the EDICT 200 constructed in accordance with illustrative embodiments of the present invention. The ESAC 114 builds EDICT data structures that a include a group corresponding to the IQ 202. The IQ 202 group includes the IQ Address 212, corresponding to a predefined address of the IQ 202 as it is allocated by the first HARP $H_0$. An IQ entry count (Count) 214 individually serializes the transaction requests pending in the IQ 202. An IQ phase value (Phase) 216 can be used for synchronization of the various communications instead of routinely employing processor interrupts. An IQ put index (PI) 218 identifies the next indexable address in the IQ 202 for storing an I/O request from the driver 201. The driver 201 constructs a driver interface entry ("DIE") 210 corresponding to the I/O request. The collection of all pending DIEs 210 is contained in a DIE table ("DIET") 211. A DIE allocation table (DAT) 220 is a bit array reflecting which entries of the DIET 211 are available for constructing the next DIE 210. The DAT 220 can be queried by the client I/F 124 (FIG. 5) to find an available entry in the DIET 211. The bit position indicates the index of the DIE 210 in the DIET 211.

Each DIE 210 entry has a group of data structures corresponding to the OQ 202 where the ESAC 114 puts responses to the transaction requests. Each OQ 202 has predefined entries with well-defined formats for all the responses possible. The group for each DIE 210 entry contains an OQ get index (GI) 222 defining the next entry in the corresponding OQ 202 for processing by the second HARP $H_1$. Similarly, each DIE 210 entry includes an OQ put index (PI) 224 defining the next entry in the corresponding OQ 202 for processing by the first HARP $H_0$ in sending a response to the corresponding transaction request. As described above for the IQ 202, each DIE 210 entry also includes an OQ entry count (Count) 226 and OQ current phase value (Phase) 228. Each OQ 204, like the IQ 202, has a base address aligned to its size. The Counts 214, 226 determine the maximum number of transaction requests and corresponding responses the EDICT 200 can have outstanding at any time.

Each DIE 210 entry also includes a scatter-gather array table (SAT) 230 that provides a pointer referencing an array of scatter-gather lists (SGLs) that are physically populated by the driver 201 as described above. Use of the SGLs allows the ESAC 114 to support very efficient cut through operations in which the data goes directly to or from the PCI-E from or to user memory. In this respect the Count 226 can define the number of address, length pairs that exist in an SGL. The Count 226 defines the number of SGL entries in the SAT 230. The EDICT 200 can allocate multiple SGLs and link them to support very large data transfers. However, the virtualization scheme used by the ESAC 114 can cause host I/O commands to be broken into real I/O commands across data storage device boundaries that align with LBA ranges starting where the LBA is evenly divisible by 256 (equivalent to 128 KB).

Figure 10:
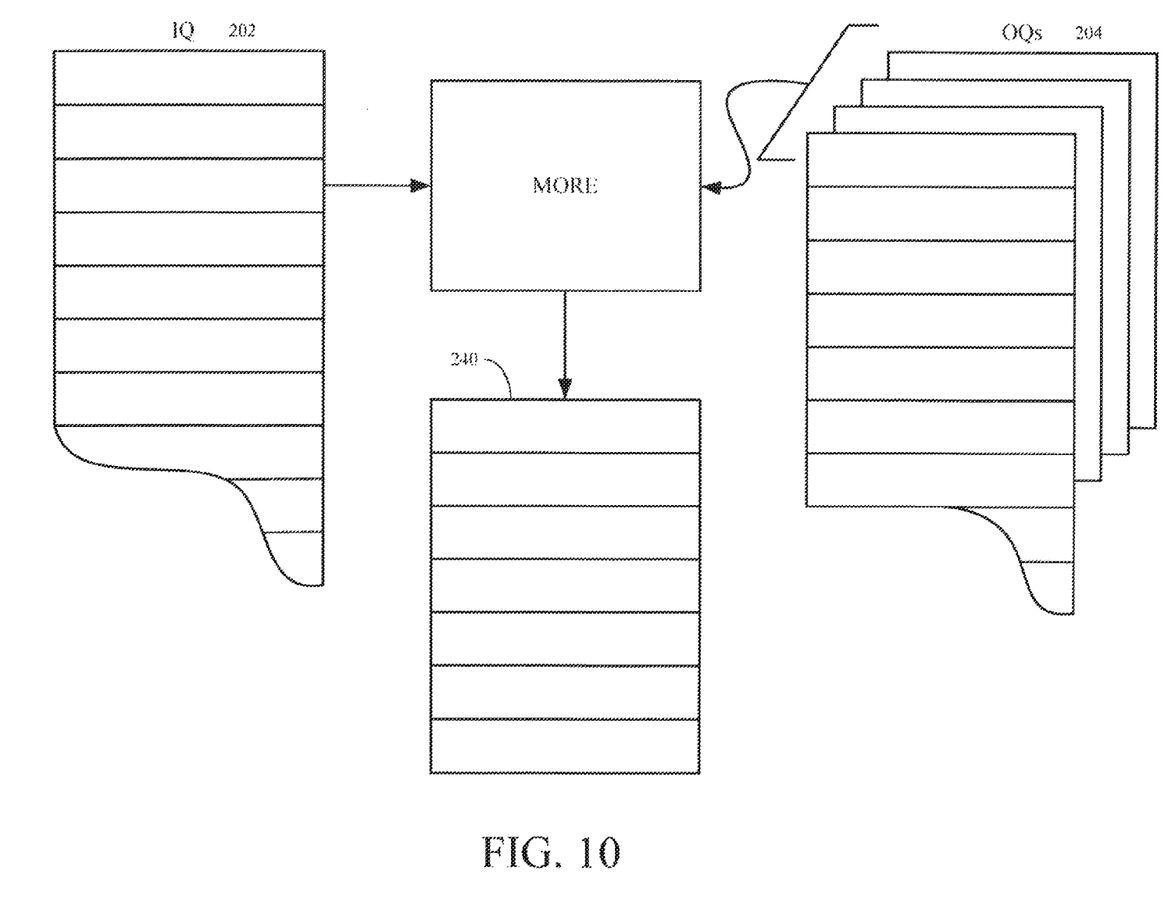
FIG. 10 diagrammatically depicts simultaneous processing of the transaction requests and the corresponding responses.

In these illustrative embodiments a polling kernel in the first HARP $H_0$ can poll for responses by looking at the next unprocessed entry in the IQ 202 and the OQ 204 to monitor for a change in the respective Phase 216, 228. This effectively provides a context-free arrangement for the processing of I/O commands between the OS 140 and the ESAC 114 in accordance with these illustrative embodiments of the present invention. FIG. 10 depicts the polling kernel works in a many to one ring environment ("MORE") to pull transaction requests from the IQ 202 of the memory 136 and puts responses to those transaction requests to the OQ 204 of the memory 142 in a combined command queue 240. Although an interrupt is likely necessary to reconcile the system when a fault condition arises, pulling and putting these events from the queues 202, 204 in the form of a ring buffer ordered by real-time arrival can be efficiently done by polling. The processing of any particular event is not computationally intensive in view of the processing capability, so polling allows balancing of multiple sources, or in other words different rings, by straightforward techniques such as invoking a count limit before switching between rings.

Using the polling kernel to combine many rings to one continuous sequential sequence of events operates more efficiently than the auspices of an operating system by eliminating the system overhead associated with the context change interrupts. The polling kernel can support data threads as well as data processing mechanisms such as semaphores in this "flow model" where events are processed by code that is self-blocking or self-destructing. For example, an I/O thread can remove itself when complete. The single reserved processor stack (FIG. 4) is used and events are dispatched to the appropriate code, and the code preferably returns with no context on the stack. A monitor thread can be a self-renewing timeout event.

Although the polling kernel can be implemented within an OS platform, it will be much more efficient if it is not buried beneath the layers of protection required in that environment. This is contrary to conventional wisdom because it means there will be times when the reserved processor core $138_4$ is substantially idle because it has no work in the queues 202, 204.

In these illustrative embodiments the polling kernel runs on the reserved processor core of an Intel® multiple-core processor in 64-bit mode at the highest CPU priority with virtual memory being mapped 1-to-1 physical with access to all of the address space. Device registers and physical addresses are directly accessible.

This dedicated-resources and context-free I/O processing makes the ESAC 114 a highly optimized code highway for I/O command traffic. The client 102 (FIG. 1) or some other remote device interacts with one or more instances of driver code running in the OS 140 which, in turn, transfers data with the storage capacity 107 via the ESAC 114. Instead of using interrupts, the MORE interface can use the phase values 216, 228 to pass responses to I/O transaction requests from the OS 140 back to the remote device. The MORE interface is initialized, preferably before the OS 140 is booted, with all phase values 216, 228 set to the maximum value (before returning modulo to the minimum). A current phase value to use and a ring size is passed as part of driver synchronization with the host interface controller. Incrementing the ring index is an operation done modulo the ring size. It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed:

1. An apparatus that executes computer instructions, comprising:
    a multiple-core processor;
    a reserved hard allocation of resources partition (HARP) dedicating physical resources for operably supporting a first processing function, the dedicated resources of the reserved HARP including:
        a reserved physical memory that is sized in relation to data processing requirements of the first processing function;
        a command buffer residing in the reserved physical memory; and
        a reserved physical core of the multiple core processor; and
    a second HARP having resources that are used for operably supporting a different second processing function, the second HARP resources operably putting transaction application requests from the second processing function to the command buffer in the reserved HARP while the transaction application resides in the second HARP.

2. The apparatus of claim 1 wherein the reserved physical core in the reserved HARP is not a boot strap processing core of the multiple core processor.

3. The apparatus of claim comprising a basic input/output system (BIOS) that boots a hardware resource manager (HRM) by the boot strap processing core of the multiple core processor.

4. The apparatus of claim 3 wherein the HRM during BIOS execution operably invokes a core allocation manager (CAM) that defines the reserved physical core and the reserved physical memory.

5. The apparatus of claim 4 wherein the CAM operably executes extensible file interface (EFI) based BIOS instructions to create the first HARP for booting the first processing function before booting the second processing function.

6. The apparatus of claim 5 wherein the CAM operably modifies advanced configuration and power interface (ACPI) system information.

7. The apparatus of claim 1 wherein the reserved physical memory is characterized as a first physical memory and wherein the second HARP includes a differently addressed second physical memory.

8. The apparatus of claim 7 wherein the second HARP resources include a direct memory access engine operably putting the transaction application requests to the command buffer residing in the first physical memory of the reserved first HARP.

9. The apparatus of claim 8 comprising a kernel that polls the first command buffer to get a selected transaction application request for processing by the first processing function.

10. The apparatus of claim 8 wherein the second processing function populates a scatter-gather list with physical data storage addresses.

11. The apparatus of claim 7 wherein the reserved HARP includes a storage array controller (SAC) performing the first processing function and the second HARP includes an operating system performing the second processing function.

12. The apparatus of claim 11 wherein the transaction application requests are data input/output (IO) commands and wherein the command buffer forms a command queue in the first physical memory capable of containing a plurality of the IO commands.

13. A method comprising:
    obtaining a complex processor system having a multiple-core processor;
    booting the complex processor system to create a first hard allocation of resources partition (HARP) exclusively reserving a first physical memory and a first command queue sized for operating a first processing function;
    after creating the first HARP, further booting the complex processor system creating a second HARP having a differently addressed second physical memory; and
    the second HARP putting a response to the first processing function in a the second command queue residing in the second physical memory.

14. The method of claim 13 wherein the booting to create the first HARP dedicates a physical core of the multiple-core processor for operating the first processing function.

15. The method of claim 14 wherein the booting to create the first HARP is characterized by the first processing function being performed by a storage array controller (SAC) running entirely on the first HARP, and wherein the booting to create the second HARP is characterized by the second processing function being performed by an operating system running entirely on the second HARP.

16. The method of claim 15 wherein the booting to create the first and second HARPs is characterized by executing basic input/output system (BIOS) instructions to reserve the first HARP resources exclusively for the SAC before booting the operating system.

17. The method of claim 14 wherein the booting to create the first HARP is characterized by the dedicated physical core not being a boot strap processing core of the multiple-core processor.

18. The method of claim 13 wherein the booting to create the second HARP is characterized by exclusively reserving the second physical memory for operating the second processing function.

19. Hard allocation of resources partition (HARP) logic in a storage controller, the storage controller including an embedded storage array controller (ESAC), a memory, and a multiple-core processor operably running an operating system, the HARP logic comprising stored computer instructions that are executable to exclusively reserve, prior to booting the operating system, a physical portion of the memory and a physical core of the multiple-core processor for the ESAC's use in executing input/output (I/O) commands with a data storage drive array.

* * * * *

UNITED STATES PATENT AND TRADEMARK OFFICE
CERTIFICATE OF CORRECTION

| | |
|---|---|
| PATENT NO. | : 9,110,731 B1 |
| APPLICATION NO. | : 13/586425 |
| DATED | : August 18, 2015 |
| INVENTOR(S) | : Stephen J. Sicola et al. |

Page 1 of 1

It is certified that error appears in the above-identified patent and that said Letters Patent is hereby corrected as shown below:

In the Claims

In Col. 9, line 46
"claim comprising" should be "claim 2 comprising"

In Col. 10, line 3
delete "first"

In Col. 10, line 31
"function in a the" should be "function in a"

Signed and Sealed this
Twenty-first Day of June, 2016

Michelle K. Lee
*Director of the United States Patent and Trademark Office*